US012608864B2

(12) United States Patent
Zhang et al.

(10) Patent No.: US 12,608,864 B2
(45) Date of Patent: Apr. 21, 2026

(54) CONTENT GENERATION DEVICE, CONTENT GENERATION METHOD, AND PROGRAM

(71) Applicant: TOPPAN HOLDINGS INC., Tokyo (JP)

(72) Inventors: Ping Zhang, Taito-ku (JP); Shiori Tada, Taito-ku (JP)

(73) Assignee: TOPPAN HOLDINGS INC., Tokyo (JP)

( * ) Notice: Subject to any disclaimer, the term of this patent is extended or adjusted under 35 U.S.C. 154(b) by 64 days.

(21) Appl. No.: 18/667,096

(22) Filed: May 17, 2024

(65) Prior Publication Data

US 2024/0303892 A1     Sep. 12, 2024

Related U.S. Application Data

(63) Continuation of application No. PCT/JP2022/042847, filed on Nov. 18, 2022.

(30) Foreign Application Priority Data

Nov. 19, 2021    (JP) .................................. 2021-188791

(51) Int. Cl.
*G06F 40/40* (2020.01)
*G06T 13/20* (2011.01)
(Continued)

(52) U.S. Cl.
CPC ............ *G06T 13/205* (2013.01); *G06F 40/40* (2020.01); *G06T 13/40* (2013.01); *G10L 13/047* (2013.01); *G10L 13/08* (2013.01); *G10L 15/063* (2013.01)

(58) Field of Classification Search
CPC ....... G06T 13/205; G06T 13/40; G06F 40/40; G10L 13/047; G10L 13/08; G10L 15/063
(Continued)

(56) References Cited

U.S. PATENT DOCUMENTS

2023/0335123 A1* 10/2023 Liu ......................... G10L 15/04
2024/0404163 A1* 12/2024 Raya ....................... G06T 13/80

FOREIGN PATENT DOCUMENTS

CN         119126980 A  * 12/2024  ............. G16H 80/00
JP       H11-312160 A     11/1999
(Continued)

OTHER PUBLICATIONS

International Search Report issued Feb. 7, 2023 in PCT/JP2022/042847, filed Nov. 18, 2022, 7 pages.
(Continued)

*Primary Examiner* — Justin W Rider
(74) *Attorney, Agent, or Firm* — Oblon, McClelland, Maier & Neustadt, L.L.P.

(57) ABSTRACT

A content generation device includes: an acquisition unit that acquires text data representing a first text, being a reading target; a voice generation unit that, using a voice generation model that based on a voice in which a user has read out a second text, being a learning target, has learned a way of reading out the second text in a voice of the user, generates a synthesized voice in which the first text represented by the acquired text data is read out in the voice of the user; and a synthesis unit that generates synthesized content by synthesizing the generated synthesized voice and a personal image of the user.

20 Claims, 11 Drawing Sheets

(51) Int. Cl.
*G06T 13/40* (2011.01)
*G10L 13/047* (2013.01)
*G10L 13/08* (2013.01)
*G10L 15/06* (2013.01)

(58) Field of Classification Search
USPC ............................................................ 704/3
See application file for complete search history.

(56) References Cited

FOREIGN PATENT DOCUMENTS

| | | | | | |
|---|---|---|---|---|---|
| JP | 2021-177647 | A | 11/2021 | | |
| KR | 102407132 | B1 * | 6/2022 | .............. | H04W 4/12 |
| KR | 102832018 | B1 * | 7/2025 | ......... | G10L 21/0356 |
| WO | WO 2015/092936 | A1 | 6/2015 | | |

OTHER PUBLICATIONS

Noriaki Saito, "Proposal of Personalized Online Course", Symposium of Information Processing Society of Japan. Groupware and Network Services Workshop 2018, Nov. 8, 2018, with English abstract.
Kagoshima, Takehiko et al. "Improvements on Variety of TTS," IPSJ SIG Technical Report, Dec. 15, 2012, vol. 2012-SLP-93, No. 7, pp. 1-4.
"Android use in broadcasting ~Utilizing robots at TV Asahi~" Jul. 1, 2019, vol. 73, No. 4, pp. 60-64.
Office Action issued Dec. 23, 2025 in Japanese Patent Application No. 2023-562416.

* cited by examiner

50

51

52

START

ACQUIRE TEXT DATA — S304

PERFORM DIVISION PROCESSING — S305

DETERMINE PLAYBACK TIME — S306

GENERATE SYNTHESIZED VOICE/PLAYBACK TIME — S308

GENERATE PERSONAL IMAGE FOR SYNTHESIS — S309

GENERATE CLONE VIDEO — S310

END

CONTENT GENERATION DEVICE, CONTENT GENERATION METHOD, AND PROGRAM

CROSS-REFERENCE TO RELATED APPLICATIONS

The present application is a continuation of and claims the benefit of priority to International Application No. PCT/JP2022/042847, filed Nov. 18, 2022, which is based upon and claims the benefit of priority to Japanese Application No. 2021-188791, filed Nov. 19, 2021. The entire contents of these applications are incorporated herein by reference.

BACKGROUND OF THE INVENTION

Field of the Invention

The present invention relates to a content generation device, a content generation method, and a program.

Description of Background Art

For example, JP H11-312160 A describes a technique that uses an independent and moving character as an avatar to promote communication relating to a document between users. The entire contents of this publication are incorporated herein by reference.

SUMMARY OF THE INVENTION

According to one aspect of the present invention, a content generation device includes a control unit including circuitry that acquires text data representing a first text, generate, using a voice generation model, a synthesized voice in which the first text is read out in a voice of the user, and generate synthesized content by synthesizing the synthesized voice and a personal image of the user. The circuitry of the control unit learns a way of reading out a second text in the voice of the user based on the reading out of the second text by the user and generates the voice generation model based on the way of reading out the second text in the voice of the user.

According to another aspect of the present invention, a content generation method includes acquiring text data representing a first text, generating, using a voice generation model generated based on a voice in which a user has read out a second text by learning a way of reading out the second text in a voice of the user, a synthesized voice in which the first text represented by the text data is read out in the voice of the user, and generating synthesized content by synthesizing the generated synthesized voice and a personal image of the user.

According to yet another aspect of the present invention, a non-transitory computer-readable medium is stored therein a program that when executed by a computer, a content generation device executes a content generation method. The content generation method includes acquiring text data representing a first text, generating, using a voice generation model generated based on a voice in which a user has read out a second text by learning a way of reading out the second text in a voice of the user, a synthesized voice in which the first text represented by the text data is read out in the voice of the user, and generating synthesized content by synthesizing the generated synthesized voice and a personal image of the user.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
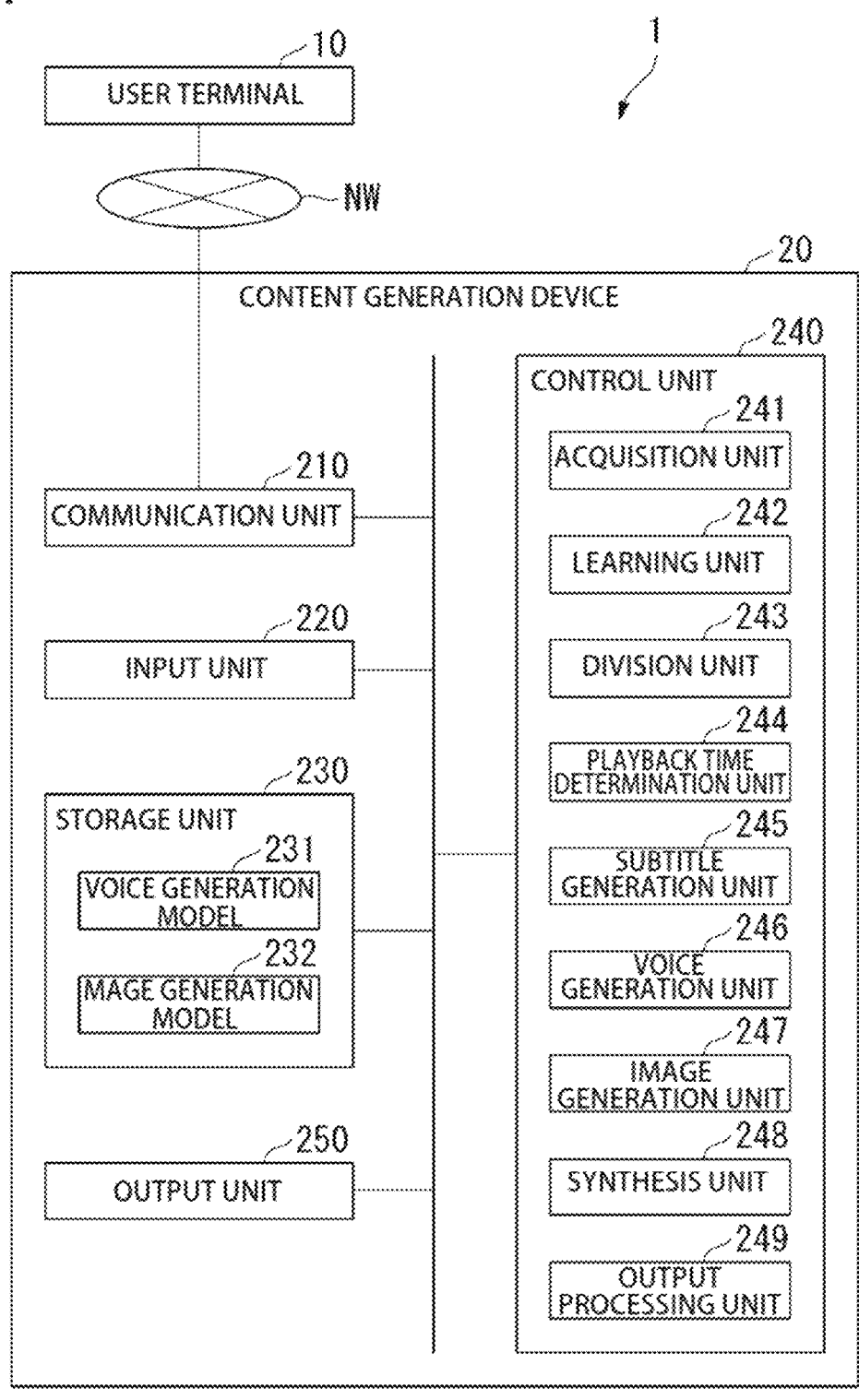
FIG. 1 is a diagram showing an example of a configuration of a content generation system according to an embodiment of the present invention.

Embodiments will now be described with reference to the accompanying drawings, wherein like reference numerals designate corresponding or identical elements throughout the various drawings.

1. Configuration of Content Generation System

A configuration of a content generation system according to an embodiment of the present invention will be described with reference to FIG. 1. FIG. 1 is a diagram showing an example of the configuration of the content generation system according to the present embodiment.

As shown in FIG. 1, the content generation system 1 includes a user terminal 10 and a content generation device 20. The user terminal 10 and the content generation device 20 are communicably connected via a network NW. Note that the user terminal 10 and the content generation device 20 may be connected to each other by wired communication or wireless communication.

(1) Content Generation System

The content generation system 1 is a system that generates content in which a digital clone of a user explains material on behalf of the user. Examples of the content include image content, web content, three-dimensional (3D) content, and 3D hologram content. The image content is content that displays a digital clone using an image such as a still image or video (footage). The web content is content that displays a digital clone in a 3D space displayed on a web browser. The 3D content is content that causes a 3D digital clone to speak. The 3D hologram is content that projects a digital clone using a 3D hologram.

A digital clone is a digitized replica of a user. A digital clone is represented by a user's personal image (hereinafter, also referred to as "personal image"), and reads out the text of the material using the user's personal voice (hereinafter, also referred to as "personal voice").

The content generation system 1 generates content by synthesizing the user's voice, the user's image, an image of the material, and the like. The content generated by synthesis is also referred to below as "synthesized content". The synthesized content is generated by synthesizing image content, web content, 3D content, 3D hologram content, and the like according to the content used by the user.

In the following, an example will be described in which the content used by the user is image content, and the content generation system 1 synthesizes the user's voice, the user's image, the image of the material, and the like, and then generates a video as synthesized content that is used by a digital clone to explain the material (hereinafter referred to as "synthesized video").

The content generation system 1 generates content based on the data of the material. The data of the material is data that at least includes data representing a first text (hereinafter, also referred to as "text data"), being a reading target, and data to be displayed so as to correspond to the content of the text data (hereinafter, also referred to as "display data").

In the following, as an example, an example will be described in which the material is material used for a presentation. Furthermore, as an example, an example will be described in which the data of the material (hereinafter, also referred to as "presentation data") is data that has been created using Microsoft PowerPoint. The PowerPoint data is data that includes both text data and display data. Specifically, the text data is text that has been input into a note portion. Further, the display data is mainly slides, and may also include videos and animations attached to the slides.

The content generation system 1 generates, based on the text data, a voice (hereinafter, also referred to as "synthesized voice") that reads out the first text in the user's personal voice. The content generation system 1 generates the synthesized voice using a learned model that has been learned by machine learning. The learned model (hereinafter, also referred to as "voice generation model") that generates the synthesized voice is a model that has learned, based on the user's voice when reading out a second text, being the learning target, a way of reading out the second text in the user's voice.

The way of reading by the user, being the learning target, is for example, an intonation, an accent, and a reading speed unique to the user.

When text data is input, the voice generation model is capable of generating and outputting a synthesized voice that reads out the first text represented by the text data in the user's personal voice and way of reading. Consequently, as a result of the content generation system 1 inputting the text data of the presentation data into the voice generation model, it is possible to acquire a synthesized voice in which the first text represented by the text data is read out in the user's personal voice and reading style.

Furthermore, the content generation system 1 generates a personal image for the digital clone (hereinafter, also referred to as "personal image for synthesis") based on the user's personal image. The personal image for synthesis may be either a still image or video (footage). The content generation system 1 generates the personal image for synthesis using a learned model that has been learned by machine learning. The learned model that generates the personal image for synthesis (hereinafter, also referred to as "image generation model") is a model that has learned the user's motions based on the user's personal image.

The user's motions that become the learning target are, for example, the user's facial movements and gestures. The user's facial movements are, for example, the movements of the mouth or changes in facial expression according to the reading. The gestures are, for example, movements of the head or hand, and body gestures according to the reading.

When the user's voice (such as a synthesized voice) is input, the image generation model is capable of generating a personal image for synthesis in which the user's motions change according to the voice. As a result, by inputting a synthesized voice, that has been generated based on the text data of the presentation data, into the image generation model, the content generation system 1 is capable of acquiring, as the personal image for synthesis, a personal image in which the motions change according to the synthesized voice.

Then, by synthesizing the generated synthesized voice and personal image for synthesis, the content generation system 1 generates data representing the user's digital clone (hereinafter, also referred to as "clone data").

In the clone data, the first text, being the reading target, is read out in the user's personal voice, and the personal image changes as though the user is performing motions according to the content of the first text. For example, in the personal image, the user's mouth and the user's facial expressions change according to the first text that is being read out (the personal voice being output), and the personal image changes as though the user is moving the head and performing hand and body gestures.

In this way, as a result of the user's personal image changing according to the user's personal voice, mismatch that occurs between the voice and the image is reduced, and the sense of awkwardness felt by the listeners can be reduced.

The clone data is generated in a data format according to the content used by the user, such as image content, web content, 3D content, 3D hologram content, and the like.

In the following, an example will be described in which the content used by the user is image content, and video representing the user's digital clone (hereinafter, also referred to as "clone video") is generated as clone data.

The content generation system 1 generates, based on the display data, an image (hereinafter, also referred to as "display image") that is displayed so as to correspond to the synthesized voice. Furthermore, the content generation system 1 generates, based on the text data, data in a text format that is displayed as subtitles (hereinafter, referred to as "subtitle text"). In addition, by synthesizing the clone video, the display image, and the subtitle text, the content generation system 1 generates a video in which the user's digital clone is explaining the content of the material as a synthesized video. The synthesized video is an example of content generated by the content generation system 1.

In the synthesized video, the user's digital clone reads out the first text according to the content of the displayed material. As a result, it can be made to appear as though the user's digital clone is explaining the material on behalf of the user.

(2) User Terminal

The user terminal 10 is a terminal used by the user. The user terminal 10 includes input devices (such as a mouse, a keyboard, and a touch panel), an output device (such as a display and speakers), and a central processing unit. For example, the user terminal 10 may be any terminal such as a personal computer (PC), a smartphone, or a tablet.

The user operates the user terminal 10, and uploads to the content generation device 20 the information that is required to generate (learn) the voice generation model and the image generation model, and the information that is required to generate the synthesized video.

The information required to generate the voice generation model is the voice of the user reading out the second text (hereinafter, also referred to as "voice for learning"), which is the learning target. The voice for learning is generated, for example, by having the user actually read out approximately 200 pieces of second text. The information required to generate the image generation model is the user's personal image for learning (hereinafter, also referred to as "personal image for learning"). The personal image for learning may be either a still image or video (footage), but changes in the user's motions can be more accurately learned by the image generation model in the case of video.

The information required to generate the synthesized video is presentation data. The content generation device 20 generates, based on the uploaded presentation data, synthesized video using the voice generation model and the image generation model.

As a result of the user operating the user terminal 10, and downloading the synthesized video from the content generation device 20 and playing the synthesized video, it is possible for the user to have the digital clone give the presentation on their behalf.

(3) Content Generation Device

The content generation device 20 is a device that generates the synthesized video (an example of content). The content generation device 20 includes input devices (such as a mouse, a keyboard, and a touch panel), an output device (such as a display and speakers), and a central processing unit. The content generation device 20 is, for example, a server device implemented by a personal computer (PC).

The content generation device 20 generates the voice generation model, the image generation model, and the synthesized video based on the various information uploaded from the user terminal 10.

Specifically, the content generation device 20 generates the voice generation model based on the voice for learning that has been uploaded from the user terminal 10. Furthermore, the content generation device 20 generates the image generation model based on the personal image for learning that has been uploaded from the user terminal 10. Moreover, the content generation device 20 generates the display image based on the display data of the presentation data that has been uploaded from the user terminal 10. In addition, the content generation device 20 generates the subtitle text based on the text data of the presentation data that has been uploaded from the user terminal 10.

Also, the content generation device 20 generates the synthesized voice by inputting the text data of the presentation data that has been uploaded from the user terminal 10 to the voice generation model, generates the personal image for synthesis by inputting the generated synthesized voice to the image generation model, and generates the clone video by synthesizing the synthesized voice and the personal image for synthesis. Then, the content generation device 20 generates the synthesized video by synthesizing the generated display image, subtitle text, and clone video.

2. Functional Configuration of Content Generation Device

A configuration of the content generation system 1 according to the present embodiment has been described above. Next, a functional configuration of the content generation device 20 according to the present embodiment will be described with reference to FIGS. 1 to 7.

As shown in FIG. 1, the content generation device 20 includes a communication unit 210, an input unit 220, a storage unit 230, a control unit 240, and an output unit 250.

(1) Communication Unit

The communication unit 210 has a function of transmitting and receiving various information. For example, the communication unit 210 communicates with the user terminal 10 via the network NW. The communication unit 210 receives the voice for learning, which is information that is required to generate the voice generation model, during communication with the user terminal 10. Furthermore, the communication unit 210 receives the personal image for learning, which is information that is required to generate the image generation model, during communication with the user terminal 10.

Moreover, the communication unit 210 receives the presentation data, which is information that is required to generate the synthesized video, during communication with the user terminal 10. In addition, the communication unit 210 transmits the synthesized video in the communication with the user terminal 10.

(2) Input Unit

The input unit 220 has a function of accepting inputs. For example, the input unit 220 accepts information inputs that have been input using an input device, such as a mouse, a keyboard, or a touch panel, that are provided as hardware in the content generation device 20.

(3) Storage Unit

The storage unit 230 has a function of storing various information. The storage unit 230 is constituted by a storage medium provided as hardware in the content generation device 20, such as a hard disk drive (HDD), a solid state drive (SSD), a flash memory, an electrically erasable programmable read only memory (EEPROM), a random access memory (RAM), and a read only memory (ROM), or any combination of these storage media.

As shown in FIG. 1, the storage unit 230 stores a voice generation model 231 and an image generation model 232. Furthermore, the storage unit 230 may also store the voice for learning, the personal image for learning, the presentation data, and the like, that the communication unit 210 has received from the user terminal 10. Moreover, the storage 230 may store the display image, the subtitle text, the synthesized voice, the personal image for synthesis, the clone video, the synthesized video, and the like, that have been generated by the content generation device 20.

(4) Control Unit

The control unit 240 has a function of controlling the overall operation of the content generation device 20. The control unit 240 is implemented, for example, by causing a central processing unit (CPU) provided as hardware in the content generation device 20 to execute a program.

As shown in FIG. 1, the control unit 240 includes an acquisition unit 241, a learning unit 242, a division unit 243, a playback time determination unit 244, a subtitle generation unit 245, a voice generation unit 246, an image generation unit 247, a synthesis unit 248, and an output processing unit 249.

(4-1) Acquisition Unit

The acquisition unit 241 has a function of acquiring various information. For example, the acquisition unit 241 may acquire the voice for learning, the personal image for learning, and the presentation data that the communication unit 210 has received from the user terminal 10. The acquisition unit 241 acquires, from the presentation data, the text data, which is the reading target, and the display data that is displayed so as to correspond to the content of the text data.

Figure 2:
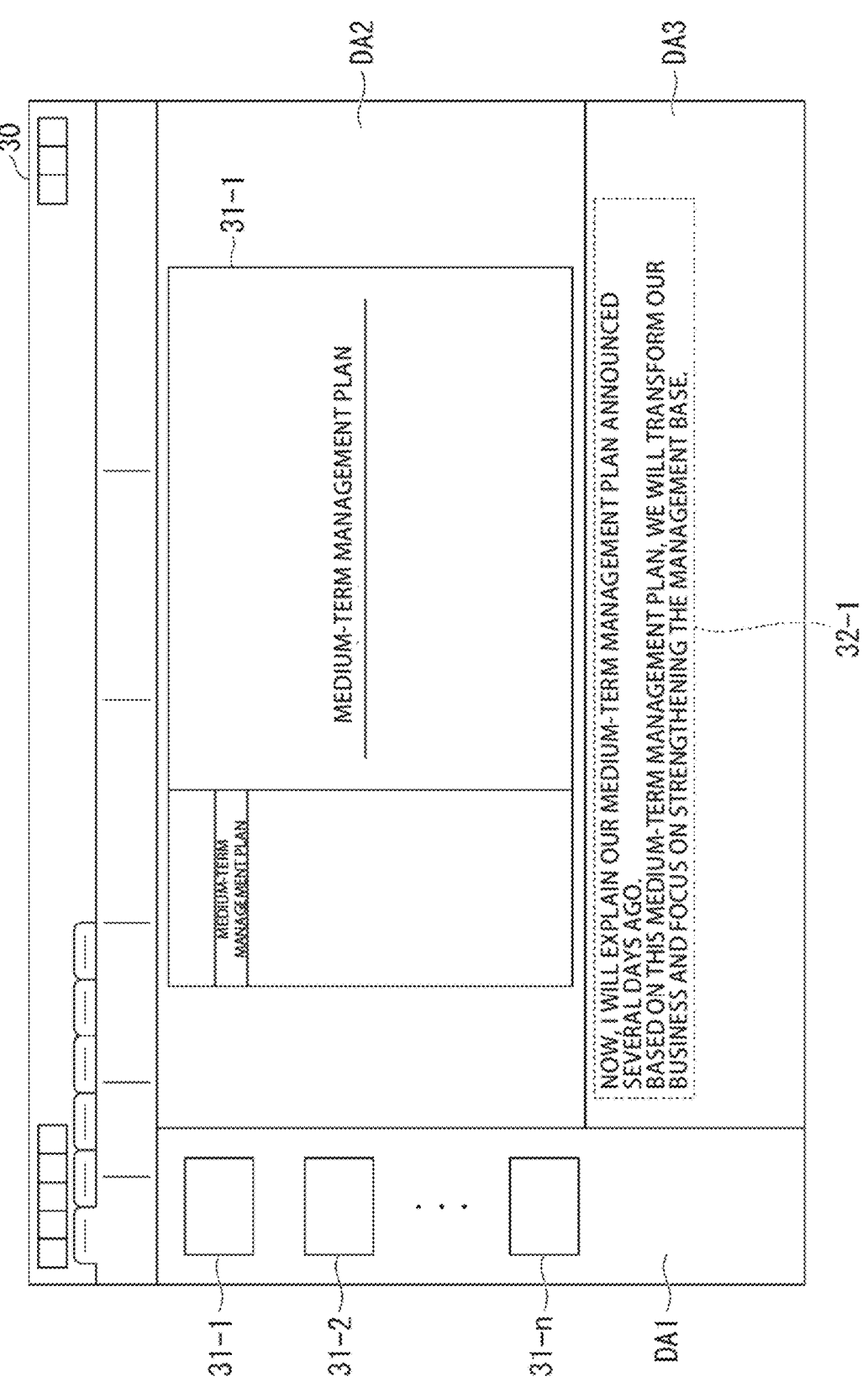
FIG. 2 is a diagram showing an example of presentation data according to an embodiment of the present invention.
Figure 3:
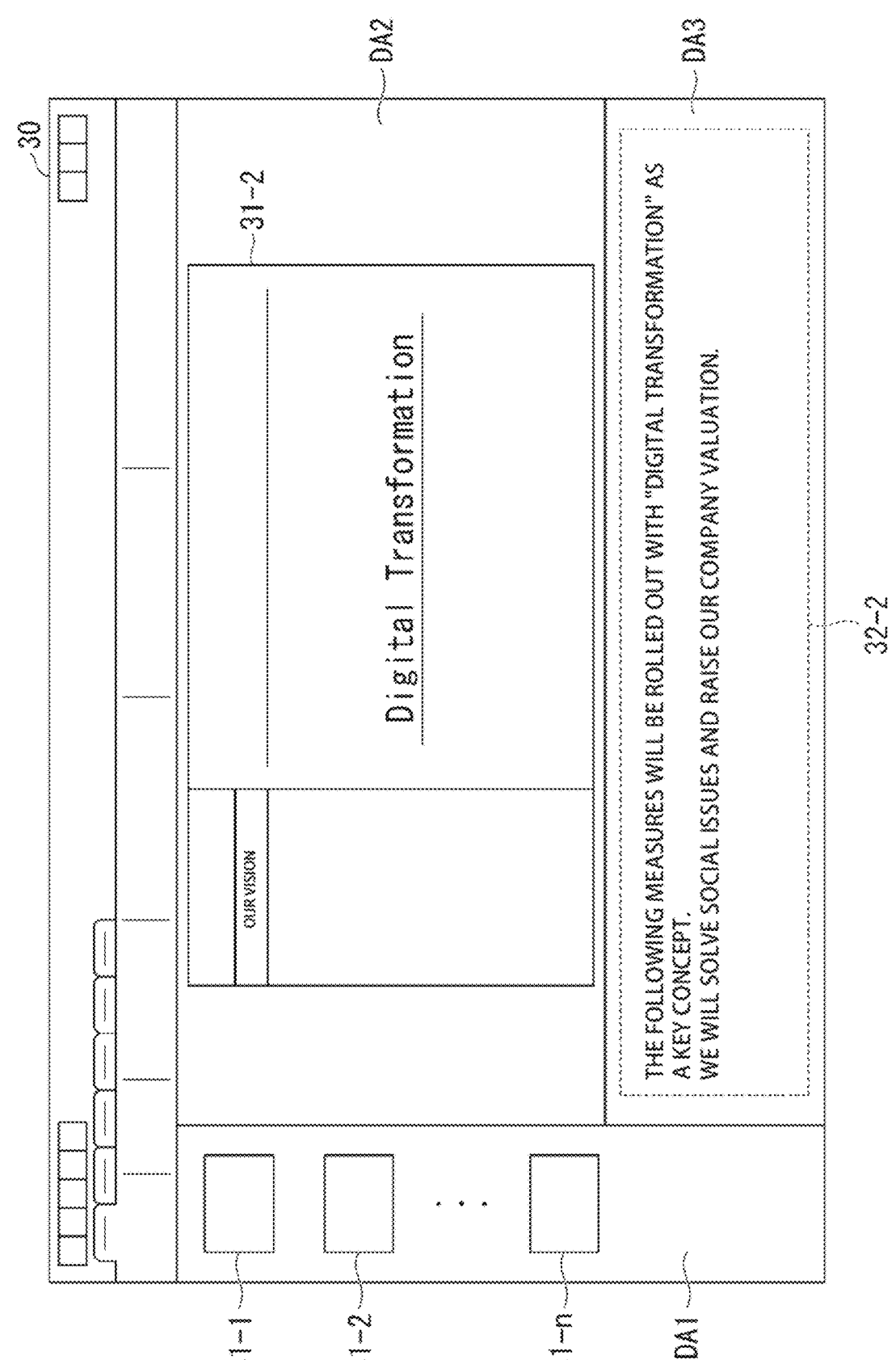
FIG. 3 is a diagram showing an example of presentation data according to an embodiment of the present invention.
Figure 4:
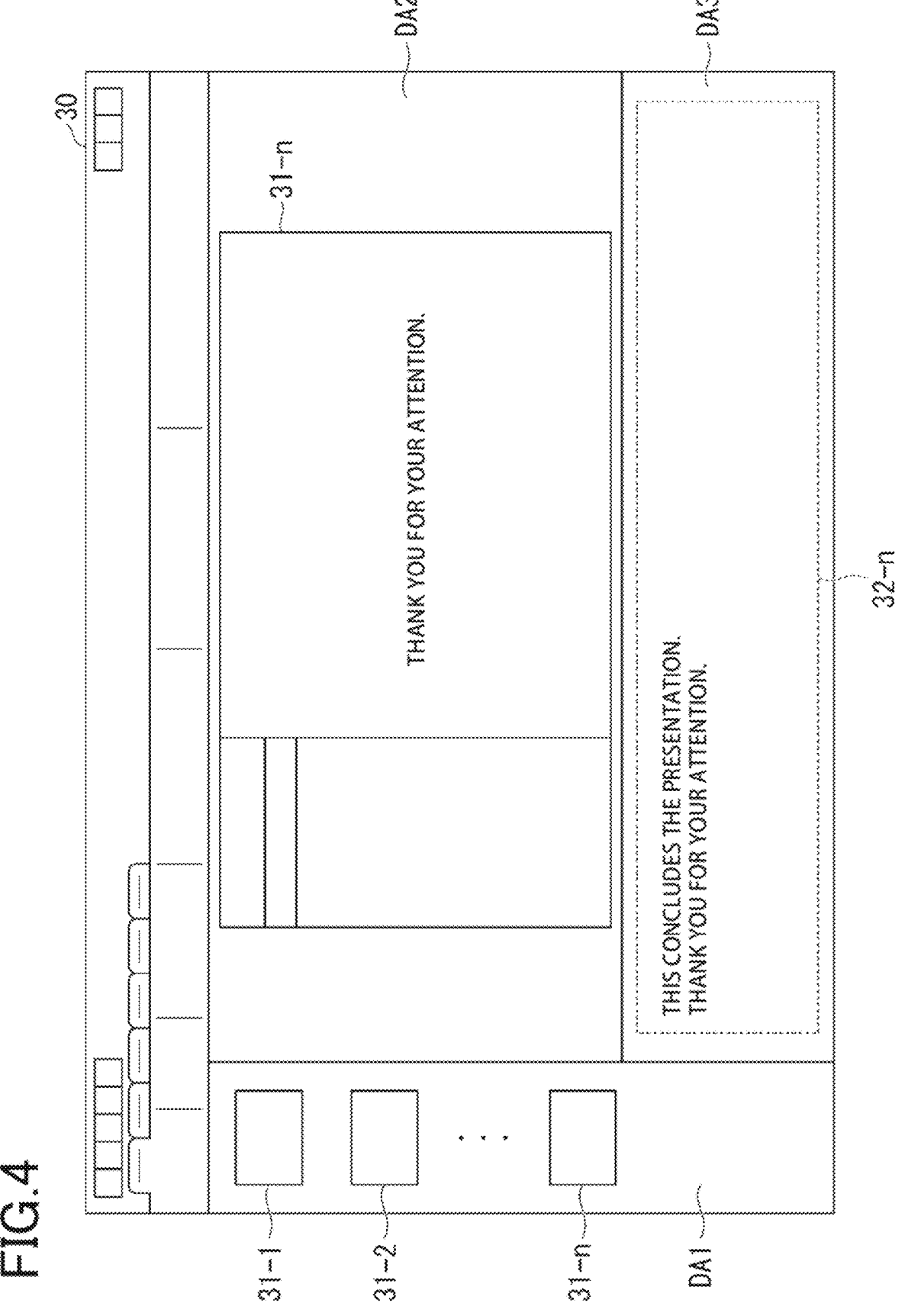
FIG. 4 is a diagram showing an example of presentation data according to an embodiment of the present invention.

Here, an example of the presentation data acquired by the acquisition unit 241 will be described with reference to FIGS. 2 to 4. FIGS. 2 to 4 are diagrams showing an example of the presentation data according to the present embodiment. FIGS. 2 to 4 illustrate presentation data 30 including n slides 31-1 to 31-$n$ (where n is a natural number). A display area DA1 of the presentation data 30 displays the slides 31-1 to 31-$n$. A display area DA2 of the presentation data 30 displays the slide that has been selected from among the slides 31-1 to 31-$n$. A display area DA3 of the presentation data 30 displays the first text corresponding to the slide that has been selected from among the slides 31-1 to 31-$n$.

FIG. 2 is a diagram showing a first slide. As shown in FIG. 2, the first slide 31-1 is displayed in the display area DA2, and the first text 32-1 corresponding to the slide 31-1 is displayed in the display area DA3.

FIG. 3 is a diagram showing a second slide. As shown in FIG. 3, the second slide 31-2 is displayed in the display area DA2, and the first text 32-2 corresponding to the slide 31-2 is displayed in the display area DA3.

FIG. 4 is a diagram showing an nth slide. As shown in FIG. 4, the nth slide 31-$n$ is displayed in the display area DA2, and the first text 32-$n$ corresponding to the slide 31-$n$ is displayed in the display area DA3.

The acquisition unit 241 acquires, from the presentation data 30, the slides 31-1 to 31-$n$ as display data, and the first text 32-1 to 32-$n$ as text data.

(4-2) Learning Unit

The learning unit 242 has a function of generating a learned model. For example, the learning unit 242 generates a learned model by performing machine learning using learning data that has been acquired by the acquisition unit 241.

Specifically, the learning unit 242 uses the voice for learning that has been acquired by the acquisition unit 241 as teaching data to perform machine learning of a way of reading the text in the user's voice. As a result of the machine learning, the learning unit 242 generates the voice generation model 231, which is capable of generating and outputting, when text data is input, a synthesized voice that reads out the first text represented by the text data in the user's personal voice.

In the present embodiment, the learning unit 242 generates the personally unique voice generation model 231 by performing transfer learning of the voice for learning (teaching data) with respect to an existing learned model that has learned the text and a way of reading the text in advance. Note that the existing learned model for generating the voice generation model 231 is stored in advance in the storage unit 230. Furthermore, the existing learned model for generating the voice generation model 231 includes a dictionary representing general intonations and accents and is capable of reproducing the general intonations and accents.

When multiple existing learned models have been prepared, the learning unit 242 is capable of generating the personally unique voice generation model 231 for multiple users by performing learning using a single user's voice for learning with respect to a single learned model. In addition, when an existing learned model has been prepared for each language, the learning unit 242 is capable of generating the personally unique voice generation model 231 for each language by performing transfer learning of the user's voice for learning with respect to the learned model in each language.

The learning unit 242 writes and stores the generated voice generation model 231 in the storage unit 230.

Furthermore, the learning unit 242 performs machine learning of the user's motions using the personal image for learning that has been acquired by the acquisition unit 241. As a result of the machine learning, the learning unit 242 generates, as the learned model, the image generation model 232 which, when a synthesized voice is input, is capable of generating and outputting the personal image for synthesis in which the user's motions change according to the voice.

In the present embodiment, the learning unit 242 generates the personally unique image generation model 232 by performing transfer learning of the personal image for learning (teacher data) with respect to an existing learned model that has learned the changes in a person's motions in advance. Note that the existing learned model for generating the image generation model 232 is stored in advance in the storage unit 230. Furthermore, the existing learned model for generating the image generation model 232 is, for example, a model that has learned mouth movements synchronized with the voice in advance using a generative adversarial network (GAN).

When multiple existing learned models have been prepared, the learning unit 242 is capable of generating the personally unique image generation model 232 for multiple users by performing learning using the personal image for learning of a single user with respect to a single learned model.

The learning unit 242 writes and stores the generated image generation model 232 in the storage unit 230.

(4-3) Division Unit

The division unit 243 has a function of dividing the first text (text data). For example, the division unit 243 divides the first text into multiple pieces based on an input indicating the dividing locations of the first text. The input indicating the dividing locations is, for example, a line break. The division unit 243 divides the first text into multiple sentences at each line break. As a result of the division unit 243 dividing the first text, the first text can be read out in divided units of sentences. As a result, because the voice is interrupted each time a single divided sentence is read out, it is possible to provide pauses when reading out the first text.

For example, in the case of the first text 32-1 shown in FIG. 2, a line break is input after "Now, . . . as announced several days ago". Although it appears that there is a line break after "Based on this medium-term management plan, . . . and focus on", this is due to a line wrap display based on the display area of the note portion, and there is no line break input in this section. Therefore, the division unit 243 divides the first text 32-1 into two sentences, namely the sentence "Now, . . . as announced several days ago", and the sentence "Based on this medium-term management plan, . . . strengthening the management base".

Furthermore, in the case of the first text 32-2 shown in FIG. 3, a line break is input after "The following measures . . . as a key concept". Therefore, the division unit 243 divides the first text 32-2 into two sentences, namely the sentence "The following measures . . . as a key concept.", and the sentence "We will solve . . . raise our company valuation".

Furthermore, in the case of the first text 32-*n* shown in FIG. 4, a line break has not been input. As a result, the division unit 243 does not divide the first text 32-*n*.

(4-4) Playback Time Determination Unit

The playback time determination unit 244 has a function of determining a playback time of the synthesized video. For example, the playback time determination unit 244 determines the playback time of the synthesized video based on the number of characters in the first text. Specifically, the playback time determination unit 244 determines, for each piece of acquired text data, a playback time of the display image corresponding to the text data by converting the number of characters in the first text represented by the text into a time.

Furthermore, the playback time determination unit 244 may determine the playback time of the synthesized video based on the reading speed of the synthesized voice. Specifically, the playback time determination unit 244 determines, for each piece of acquired text data, a playback time of the display image corresponding to the text data by calculating the time the reading ends based on the reading speed.

When there are multiple display images, the playback time determination unit 244 calculates a playback time of the synthesized video by adding together the playback time of each display image.

Note that the playback time determination unit 244 may determine the playback time of the synthesized video based on both the number of characters in the first text and the reading speed.

Furthermore, the playback time determination unit 244 may determine the playback time of the synthesized video by considering the pauses used while reading out the first text. For example, the playback time determination unit 244 calculates the time required to express the pauses according to the number of sentences that have been divided by the division unit 243 and add then the time to the playback time calculated based on the number of characters and the reading speed mentioned above.

(4-5) Subtitle Generation Unit

The subtitle generation unit 245 has a function of generating subtitle text. For example, the subtitle generation unit 245 generates the subtitle text based on the text data that has been acquired by the acquisition unit 241. Specifically, the subtitle generation unit 245 generates the subtitle text in units of sentences that have been divided by the division unit 243.

Note that, when the language used in the text data acquired by the acquisition unit 241 and the language corresponding to the voice generation model 231 are different, the subtitle generation unit 245 may generate subtitle text in which the text data has been translated to the language corresponding to the voice generation model 231.

(4-6) Voice Generation Unit

The voice generation unit 246 has a function of generating the synthesized voice. For example, the voice generation unit 246 uses the user's personally unique voice generation model 231 to generate a synthesized voice in which a first voice representing the text data that has been acquired by the acquisition unit 241 is read out in the user's voice.

The voice generation unit 246 generates a synthesized voice for each piece of text data (sentence) that has been divided by the division unit 243. As a result, because the voice is interrupted each time one of the synthesized voices that have been generated is read out, it is possible to provide pauses when reading out the first text represented by the text data.

Further, it is assumed that it is necessary to generate, from text data using a first language (such as Japanese), a synthesized voice that performs the reading in a second language (such as English) that is different from the first language. In this case, the voice generation unit 246 uses the voice generation model 231 corresponding to the second language, which is obtained by performing transfer learning based on the voice for learning (teacher data) in the first language, which has been used for learning by the voice generation model 231 corresponding to the first language. As a result, the voice generation unit 246 is capable of generating a synthesized voice in which the first text representing the text data in the first language is read out in the user's voice using the second language.

(4-7) Image Generation Unit

The image generation unit 247 has a function of generating various images for generating the synthesized video. For example, the image generation unit 247 generates a display image that is displayed so as to correspond to the synthesized voice based on the display data acquired by the acquisition unit 241. Specifically, the image generation unit 247 generates the display image by converting the display data into an image.

Furthermore, the image generation unit 247 uses the user's personally unique image generation model 232 to generate a personal image for synthesis in which the user's motions change according to the synthesized voice generated by the voice generation model 231.

For example, the image generation unit 247 generates a personal image for synthesis in which the user's facial movements change according to the reading by the synthesized voice. Specifically, the image generation unit 247 generates the personal image for synthesis in which the movements of the user's mouth and the user's facial expressions change according to the reading by the synthesized voice.

In addition, the image generation unit 247 may generate a personal image for synthesis which changes as though the user is making gestures according to the reading by the synthesized voice. Specifically, the image generation unit 247 generates a personal image for synthesis in which the user is moving the head and the user is performing hand and body gestures according to the reading by the synthesized voice.

In this way, the image generation unit 247 generates a personal image for synthesis that reproduces the user's movements when the user is reading out text or when giving a presentation. As a result, the clone shown in the clone video is capable of reading out text or giving a presentation while moving more naturally like the user.

(4-8) Synthesis Unit

The synthesis unit 248 has a function of performing various synthesis. For example, the synthesis unit 248 generates a synthesized video by synthesizing at least the synthesized voice generated by the voice generation unit 246, the display image generated by the image generation unit 247, and the user's personal image. Specifically, the synthesis unit 248 generates the clone video by synthesizing the synthesized voice generated by the voice generation unit 246 and the personal image for synthesis generated by the image generation unit 247. Then, the synthesis unit 248 generates the synthesized video by synthesizing the display image and the generated clone video.

Note that, when there are multiple slides (display data) and multiple first text (text data) as in the presentation data shown in FIGS. 2 to 4, a display image, a synthesized voice, and a personal image for synthesis are generated for each pair including a slide and first text. Consequently, the synthesis unit 248 generates a synthesized video by generating the clone video for each pair including a slide and first text. As a result, the same number of synthesized videos as number of slides is generated from a single piece of presentation data. Then, the synthesis unit 248 synthesizes the synthesized videos generated from the single presentation data to generate one final synthesized video.

Furthermore, when a single first text is divided into multiple sentences by the division unit 243, multiple synthesized voices are generated from a single first text by the voice generation unit 246. As a result, the image generation unit 247 generates a personal image for synthesis with respect to each of the synthesized voices. Consequently, the synthesis unit 248 generates a single clone video by synthesizing the synthesized voices and the personal images for synthesis such that they are associated with each other.

In addition, the synthesis unit 248 may generate the synthesized video by also synthesizing the subtitle text generated by the subtitle generation unit 245 in addition to the display image and the clone video. When synthesizing the subtitle text, the synthesis unit 248 may perform the synthesis such that only one subtitle text is displayed at once, or may perform the synthesis such that multiple subtitle text items are displayed at the same time.

Figure 5:
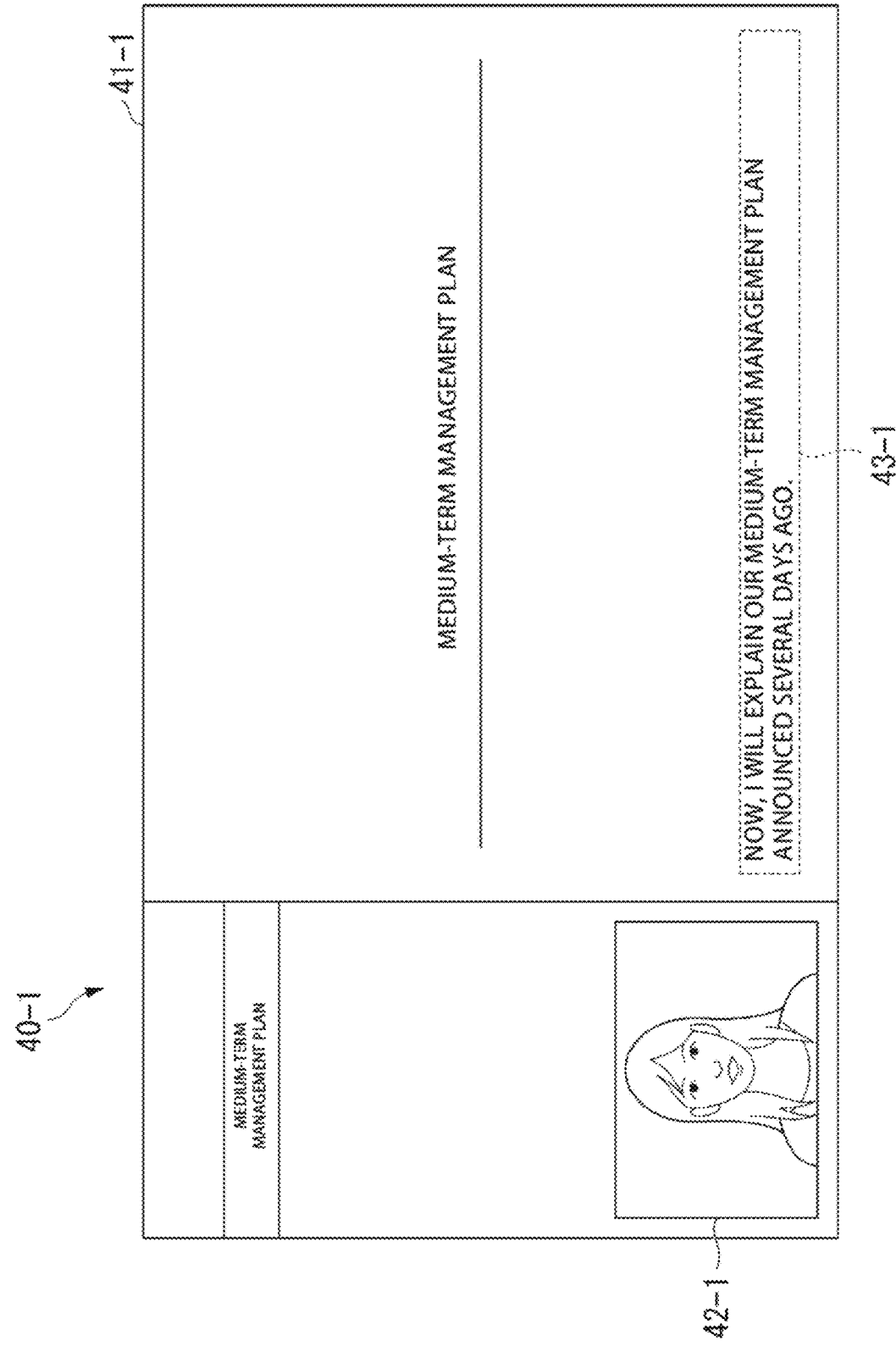
FIG. 5 is a diagram showing an example of a synthesized video according to an embodiment of the present invention.
Figure 6:
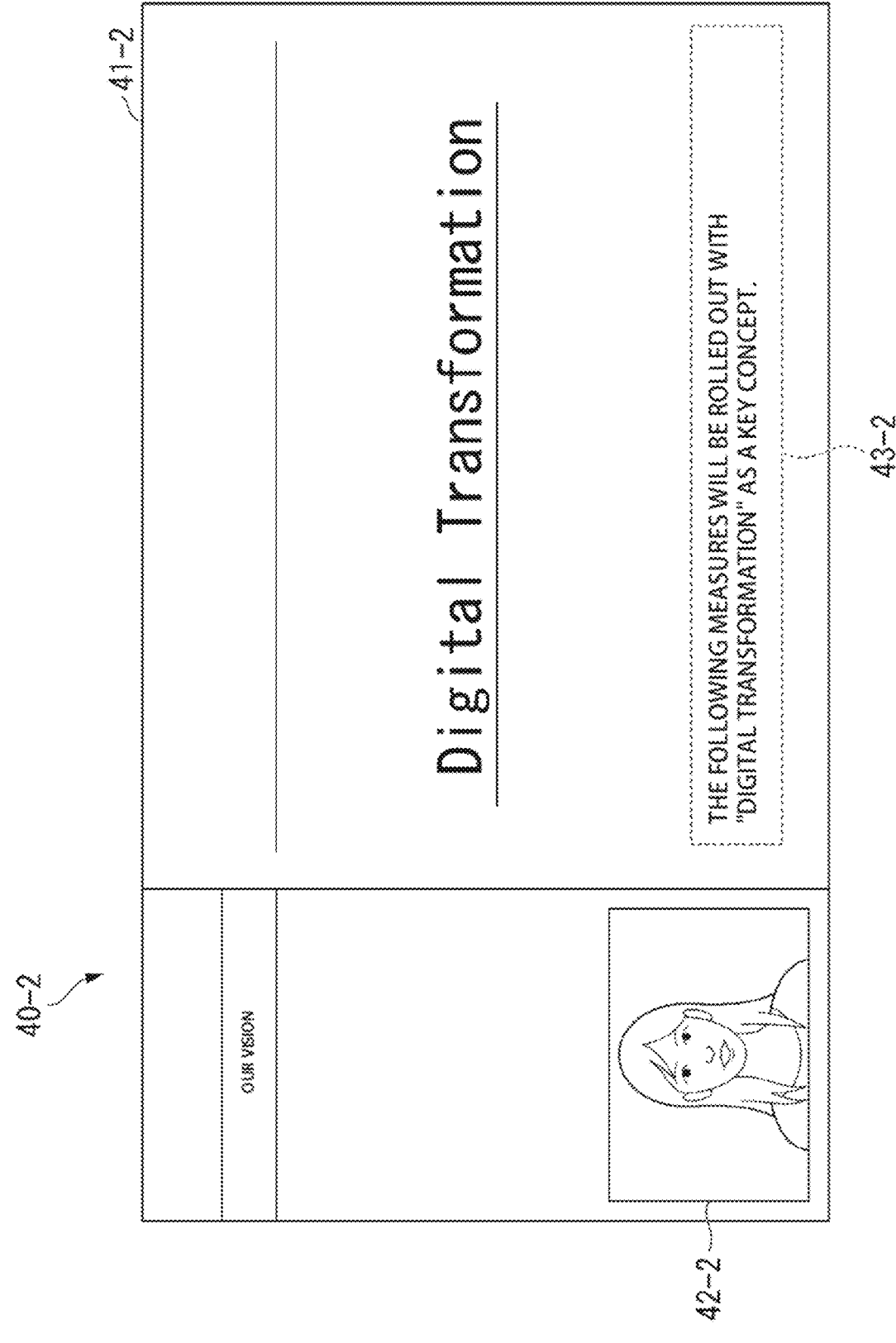
FIG. 6 is a diagram showing an example of a synthesized video according to an embodiment of the present invention.
Figure 7:
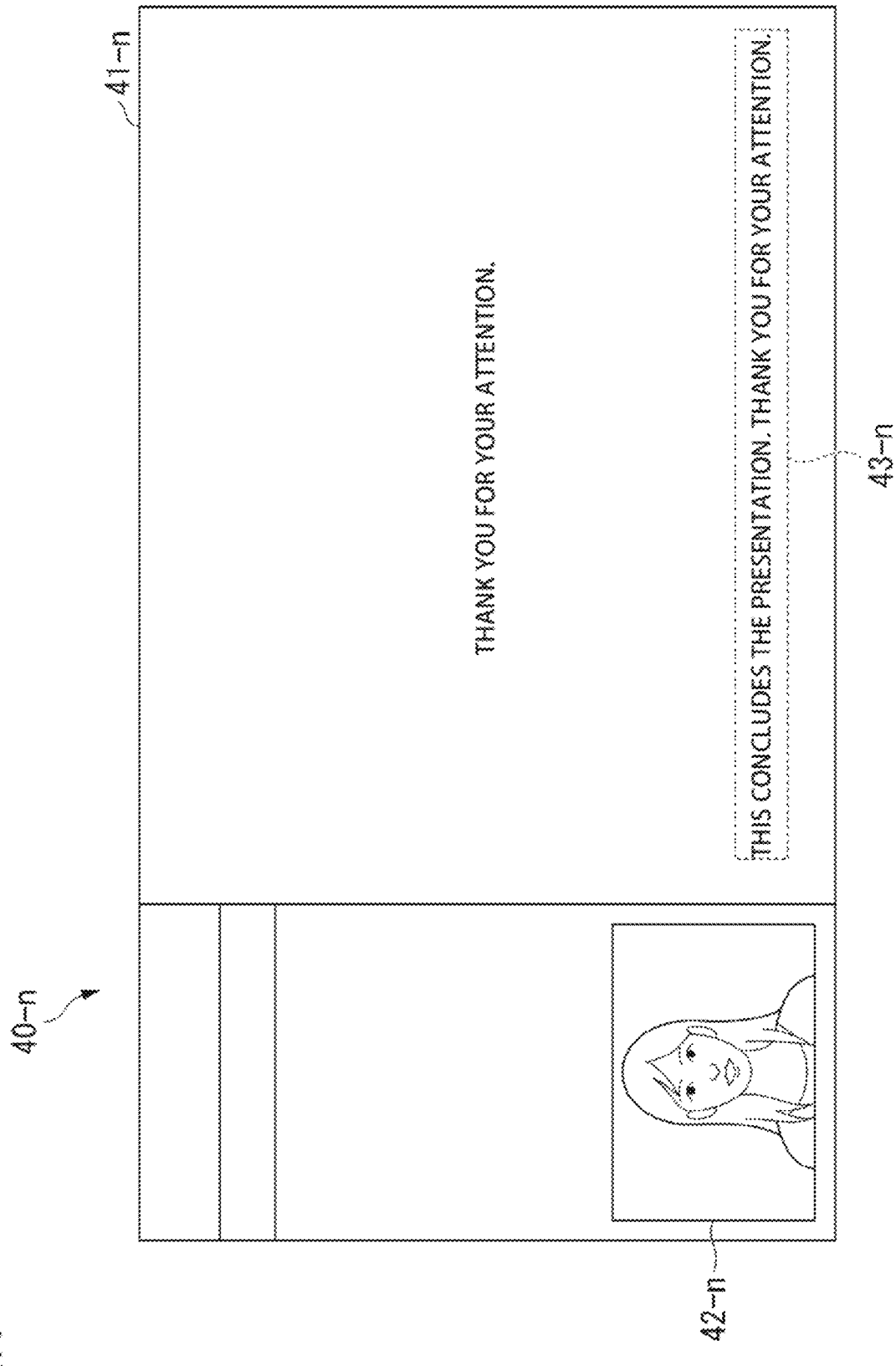
FIG. 7 is a diagram showing an example of a synthesized video according to an embodiment of the present invention.

Here, an example of a synthesized video generated by the synthesis unit 248 will be described with reference to FIGS. 5 to 7. FIGS. 5 to 7 are diagrams showing an example of a synthesized video according to the present embodiment. In FIGS. 5 to 7, portions of the synthesized video generated based on the presentation data 30 shown in FIGS. 2 to 4 are being respectively displayed.

In FIG. 5, as a portion of the synthesized video generated based on the presentation data 30, a synthesized video 40-1 that has been generated based on the slide 31-1 and the first text 32-1 shown in FIG. 2 is displayed. As shown in FIG. 5, the synthesized video 40-1 is constituted by a display image 41-1, a clone video 42-1, and subtitle text 43-1. When section of the synthesized video corresponding to the synthesized video 40-1 is played back, the user's clone being displayed in the clone video 42-1 reads out the displayed subtitle text 43-1 using the user's personal voice in the user's reading style. When the reading of the displayed subtitle text 43-1 is completed, the next subtitle text 43-1 is displayed. When the reading of all of the subtitle text 43-1 included in the synthesized video 40-1 has been completed, the display image 41-1 switches to the next image (that is, the next section of the synthesized video is played back).

In FIG. 6, as a portion of the synthesized video generated based on the presentation data 30, a synthesized video 40-2 that has been generated based on the slide 31-2 and the first text 32-2 shown in FIG. 3 is displayed. As shown in FIG. 6, the synthesized video 40-2 is constituted by a display image 41-2, a clone video 42-2, and subtitle text 43-2. When the playback of the section of the synthesized video corresponding to the synthesized video 40-1 is completed, the section corresponding to the synthesized video 40-2 is played back in the same manner as the section corresponding to the synthesized video 40-1.

In FIG. 7, as a portion of the synthesized video generated based on the presentation data 30, a synthesized video 40-n that has been generated based on the slide 31-n and the first text 32-n shown in FIG. 4 is displayed. As shown in FIG. 7, the synthesized video 40-n is constituted by a display image 41-n, a clone video 42-n, and subtitle text 43-n. The synthesized video 40-n is the last section of the synthesized video. The section of the synthesized video corresponding to the synthesized video 40-n is played back in the same manner as the sections corresponding to the synthesized video 40-1 and synthesized video 40-2, and when the playback of the section corresponding to the synthesized video 40-n is completed, the playback of the entire synthesized video is completed.

(4-9) Output Processing Unit

The output processing unit 249 has a function of controlling various outputs. For example, the output processing unit 249 transmits the synthesized video generated by the synthesis unit 248 to the user terminal 10. Furthermore, the output processing unit 249 may play back the synthesized video generated by the synthesis unit 248, transmit the video and voice being played back to the user terminal 10, and cause the user terminal 10 to output the footage and voice.

(5) Output Unit

The output unit 250 has a function of outputting various information. The output unit 250 is implemented by, for example, a display device such as a display or touch panel included as hardware in the content generation device 20, or a voice output device such as a speaker. The output unit 250 outputs, for example, a screen or a voice in response to an input from the output processing unit 249.

3. Processing Flow

A functional configuration of the content generation device 20 according to the present embodiment has been described above. Next, the processing flow performed by the content generation device 20 according to the present embodiment will be described with reference to FIGS. 8 to 10.

(1) Processing for Generating Voice Generation Model

Figure 8:
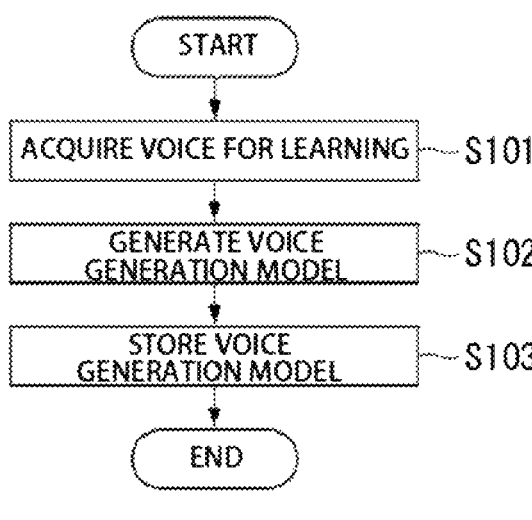
FIG. 8 is a flowchart showing an example of a processing flow in the generation of a voice generation model according to an embodiment of the present invention.

The processing by which the content generation device 20 generates the voice generation model 231 will be described with reference to FIG. 8. FIG. 8 is a flowchart showing an example of a processing flow in the generation of the voice generation model 231 according to the present embodiment. The content generation device 20 generates and prepares the voice generation model 231 in advance in order to generate the synthesized video.

First, as shown in FIG. 8, the acquisition unit 241 of the content generation device 20 acquires a voice for learning (S101). Specifically, the acquisition unit 241 acquires the voice for learning that the communication unit 210 of the content generation device 20 has received from the user terminal 10.

Then, the learning unit 242 of the content generation device 20 generates the voice generation model 231 (S102). Specifically, the learning unit 242 generates the user's personally unique voice generation model 231 by transfer learning of the voice for learning (teacher data) acquired from the acquisition unit 241 with respect to an existing learned model that has learned the second text, which is the learning target, and a text reading style in advance. Note that the existing learned model for generating the voice generation model 231 is stored in advance in the storage unit 230 of the content generation device 20.

Then, the learning unit 242 writes and stores the generated voice generation model 231 in the storage unit 230 (S103).

(2) Processing for Generating Image Generation Model

Figure 9:
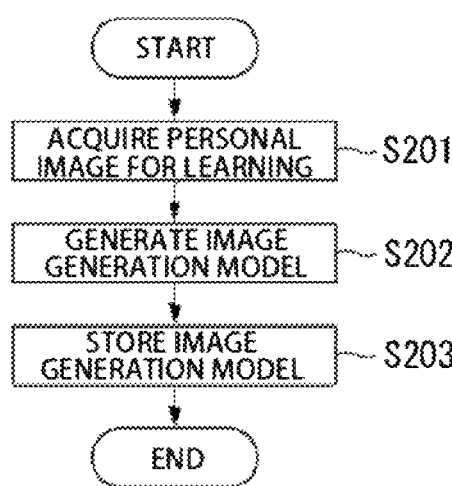
FIG. 9 is a flowchart showing an example of a processing flow in the generation of a image generation model according to an embodiment of the present invention.

The processing by which the content generation device 20 generates the image generation model 232 will be described with reference to FIG. 9. FIG. 9 is a flowchart showing an example of a processing flow in the generation of the image generation model 232 according to the present embodiment. The content generation device 20 generates and prepares the image generation model 232 in advance in order to generate the synthesized video.

First, as shown in FIG. 9, the acquisition unit 241 acquires a personal image for learning (S201). Specifically, the acquisition unit 241 acquires the personal image for learning that the communication unit 210 has received from the user terminal 10.

Then, the learning unit 242 generates the image generation model 232 (S202). Specifically, the learning unit 242 generates the user's personally unique image generation model 232 by transfer learning of the personal image for learning (teacher data) acquired from the acquisition unit 241 with respect to an existing learned model that has learned the changes in a person's motions in advance. Note that the existing learned model for generating the image generation model 232 is stored in advance in the storage unit 230 of the content generation device 20.

Further, the learning unit 242 writes and stores the generated image generation model 232 in the storage unit 230 (S203).

(3) Processing for Generating Synthesized Video

Figure 10:
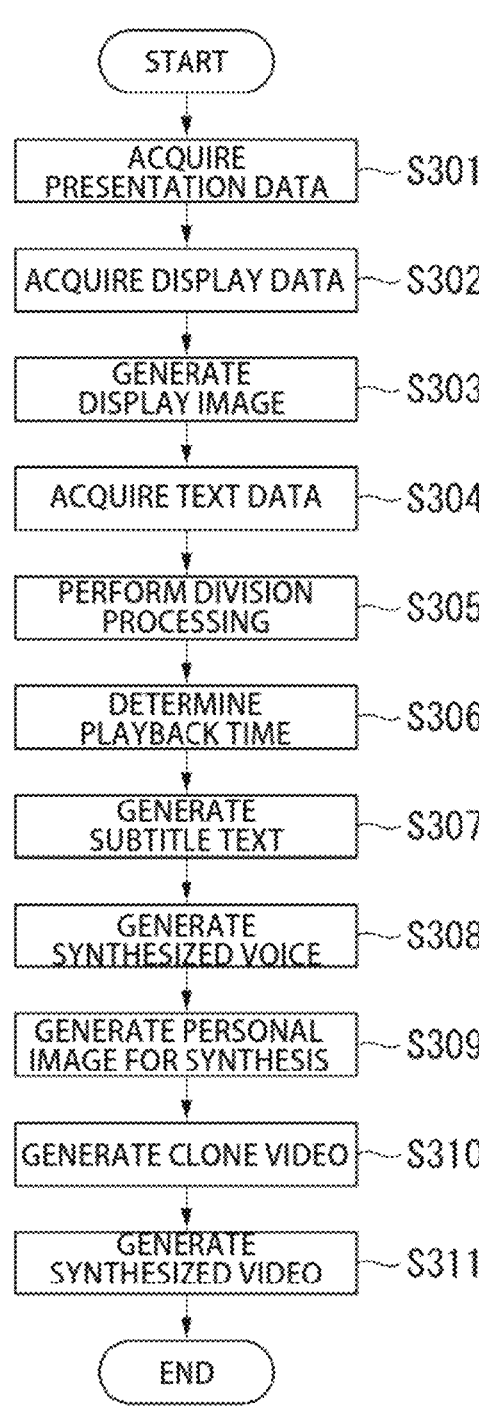
FIG. 10 is a flowchart showing an example of a processing flow in the generation of a synthesized video according to an embodiment of the present invention.

The processing by which the content generation device 20 generates the synthesized video will be described with reference to FIG. 10. FIG. 10 is a flowchart showing an example of a processing flow in the generation of a synthesized video according to the present embodiment.

First, as shown in FIG. 10, the acquisition unit 241 acquires presentation data (S301). Specifically, the acquisition unit 241 acquires the presentation data that the communication unit 210 has received from the user terminal 10.

Then, the acquisition unit 241 acquires display data (S302). Specifically, the acquisition unit 241 acquires the slides included in the acquired presentation data as display data.

Next, the image generation unit 247 of the content generation device 20 generates a display image (S303). Specifically, the image generation unit 247 generates the display image by converting the display data acquired by the acquisition unit 241 into an image.

Then, the acquisition unit 241 acquires text data (S304). Specifically, the acquisition unit 241 acquires the first text in the note portion included in the acquired presentation data as text data.

Next, the division unit 243 of the content generation device 20 performs division processing (S305). Specifically, the division unit 243 divides a single first text into multiple sentences by dividing the first text acquired by the acquisition unit 241 at each line break.

Then, the playback time determination unit 244 of the content generation device 20 determines the playback time of the synthesized video (S306). Specifically, the playback time determination unit 244 determines the playback time of the synthesized video based on the number of characters in the first text, the reading speed, and the pauses between the divided first text.

Next, the subtitle generation unit 245 of the content generation device 20 generates subtitle text (S307). Specifically, the subtitle generation unit 245 generates the subtitle text in units of the divided first text.

Then, the voice generation unit 246 of the content generation device 20 generates a synthesized voice (S308). Specifically, the voice generation unit 246 inputs the sentences that have been divided by the division unit 243 one at a time to the voice generation model 231 stored in the storage unit 230. As a result, the synthesized voices are generated by the voice generation model 231. Further, the voice generation unit 246 acquires the synthesized voices that has been output from the voice generation model 231.

Next, the image generation unit 247 generates a personal image for synthesis (S309). Specifically, the image generation unit 247 inputs the synthesized voices that have been generated by the voice generation unit 246 one at a time to the image generation model 232 stored in the storage unit 230. As a result, the personal image for synthesis is generated by the image generation model 232. Further, the image generation unit 247 acquires the personal image for synthesis that has been output from the image generation model 232.

Then, the synthesis unit 248 of the content generation device 20 generates a clone video (S310). Specifically, the synthesis unit 248 generates the clone video by synthesizing, for each synthesized voice generated by the voice generation unit 246, the personal image for synthesis that has been generated by the image generation unit 247.

Next, the synthesis unit 248 generates a synthesized video (S311). Specifically, the synthesis unit 248 generates a clone video in which the display image generated by the image generation unit 247 and the subtitle text generated by the subtitle generation unit 245 have been synthesized and generates the synthesized video. After generating the synthesized video, the content generation device 20 ends the processing. Note that the content generation device 20 may write and store the generated synthesized video in the storage unit 230 or transmit the generated synthesized video to the user terminal 10 as required.

As described above, the content generation device 20 according to the present embodiment includes the acquisition unit 241, the voice generation unit 246, the image generation unit 247, and the synthesis unit 248.

The acquisition unit 241 acquires the text data representing the first text, which is the reading target, and the display data that is displayed so as to correspond to the content of the text data.

The voice generation unit 246 generates the synthesized voice that reads out the first text representing the acquired text data in the user's voice by using the voice generation model 231, which has learned, based on the user's voice when reading out the second text, which is the learning target, the way of reading out the second text in the user's voice.

The image generation unit 247 generates the display image to be displayed so as to correspond to the synthesized voice based on the acquired display data.

The synthesis unit 248 generates synthesized content by synthesizing the generated synthesized voice and display image, and the user's personal image.

With this configuration, when the synthesized content that has been generated is played back, the first text representing the text data, which is the reading target, is read out in the user's personal voice in the way of reading that more fully expresses the user's likeness.

Therefore, the content generation device 20 according to an embodiment of the present invention reduces the sense of awkwardness felt by the listeners when the text is read out and can more fully express the speaker's likeness.

4. Modifications

An embodiment of the present invention has been described. Next, modifications of an embodiment of the present invention will be described. Each of the modifications described below may be independently applied to an embodiment of the present invention or may be combined when applied to an embodiment of the present invention.

Furthermore, each of the modifications may be applied so as to replace the configuration described in an embodiment of the present invention or may be additionally applied to the configuration described in an embodiment of the present invention.

For example, the voice generation unit 246 may express the user's facial expressions with the synthesized voice by adjusting parameters. The voice generation unit 246 sets parameters such as 80% joy, 20% surprise according to the content of the text data. Note that the types of emotions may be a combination of various emotions other than joy and surprise, such as sadness or anger. As a result, the voice generation unit 246 can generate a synthesized voice that is capable of expressing, in addition to a way of reading that is authentic to the user, various emotions according to the content of the text data.

Furthermore, the content generation device 20 may have a function that enables the synthesized content that has been generated by the synthesis unit 248 to be edited. The user inputs the edit content to the user terminal 10. The content generation device 20 edits the synthesized content according to the user inputs made with respect to the user terminal 10. In this function, for example, editing of the slides (display image), the subtitle text, the voice of the clone data, and the personal image is possible. When editing the slides, it is possible to edit the content of the slides, switch the display order of the slides, add new slides, delete existing slides, and the like.

In addition, in the embodiment described above, although an example has been described in which a clone video, in which multiple synthesized voices and multiple personal images for synthesis have been synthesized, is synthesized with respect to a single display image, the present invention is not limited to such an example. For example, multiple display images may be synthesized with respect to a clone video in which a single synthesized voice and a single personal image for synthesis have been synthesized. In this case, the display images are switched and displayed while the reading of the single synthesized voice is completed.

Moreover, in the embodiment described above, an example has been described in which the data of the material is PowerPoint data, but the present invention is not limited to such an example. For example, as long as the data of the material includes text data and display data, the data may also be data created using Microsoft Word, data created using Microsoft Excel, portable document format (PDF) data, and the like. In addition, the data of the material may also be a combination of data containing only text data and data containing only display data.

Also, in the embodiment described above, an example has been described in which the content generation system 1 is configured by the user terminal 10 (client) and the content generation device 20 (server), but the present invention is not limited to such an example. For example, the content generation system 1 may be configured by only a content generation device 20 that can be directly operated by the user. That is, the content generation device 20 may also play the role of the user terminal 10. In this case, the user is capable of generating and using the synthesized content without connecting a terminal to the network NW.

Furthermore, the functions of the content generation device 20 may be implemented by multiple devices. For example, the function of generating the voice generation model 231 and the image generation model 232 may be implemented by another device. In this case, the content generation device 20 can generate synthesized content in the same manner as in the embodiment above by storing the voice generation model 231 and the image generation model 232 that have been generated by another device in the storage unit 230.

In addition, in the embodiment described above, although an example has been described in which the acquisition unit 241 acquires the slides included in the presentation data as the display data, and the image generation unit 247 generates the display image by converting the display data acquired by the acquisition unit 241 into an image, the present invention is not limited to such an example.

A configuration is also possible in which the acquisition unit 241 acquires the text data to be read out by the digital clone without acquiring the display data, and the image generation unit 247 generates the personal image for synthesis (digital clone), in which the user's motions change according to the generated synthesized voice, and does not generate a display image that is displayed so as to correspond to the synthesized voice.

Figure 11:
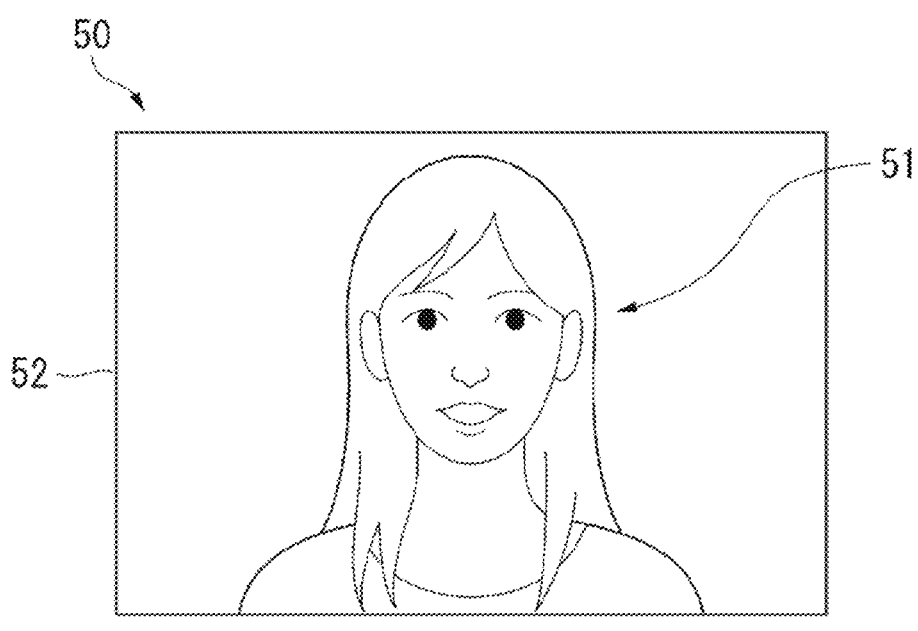
FIG. 11 is a diagram showing an example of a synthesized video according to a modification of an embodiment of the present invention.

In the present modification, as shown in FIG. 11, the displayed synthesized video 50 is a video in which a synthesized voice and a digital clone 51 have been synthesized (clone video 52), and a display image generated by the image generation unit 247, such as the slides, is not included in the synthesized video 50.

In the present modification, subtitle text may be displayed in the clone video 52. On the other hand, when subtitle text is not needed, the subtitle generation unit 245 may be omitted from the constituent elements of the content generation device 20 in the embodiment described above.

Figure 12:
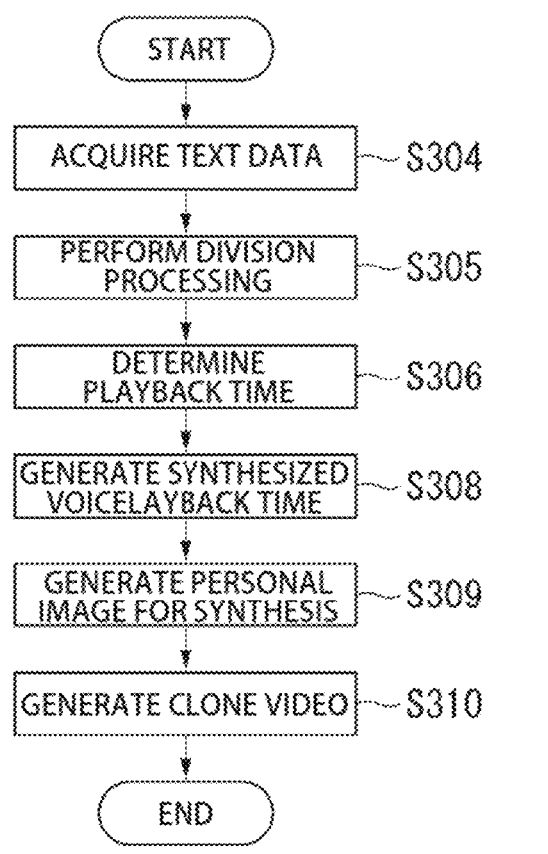
FIG. 12 is a flowchart showing an example of a processing flow in the generation of a synthesized video according to a modification of an embodiment of the present invention.

Next, a processing flow performed when generating a synthesized video in the present modification will be described with reference to FIG. 12. As shown in FIG. 12, the content generation device 20 of the present modification executes the processes in the embodiment above in the order of S304, S305, S306, S308, S309, and S310. The aspects that are different from the embodiment above will be described below.

In S304, the acquisition unit 241 at least acquires the text data to be read out by the digital clone. Although the division processing in S305 and the playback time determination in S306 are both executed, it is possible to omit S305 and the division unit 243 that executes this process when the text data is already divided, and to omit S306 and the playback time determination unit 244 that execute this process if it is not necessary to determine the playback time.

In S309, although the image generation unit 247 generates the personal image for synthesis (digital clone), in which the user's motions change according to the generated synthesized voice, it does not generate the display image such as the slides that are displayed so as to correspond to the synthesized voice.

In the present modification, because the generated synthesized video includes a synthesized voice and a personal image for synthesis, but does not include a display image, the generation of the synthesized video is completed after generating the clone video in S310. That is, in the present modification, S311 in the embodiment described above is not essential. However, when subtitle text is included in the synthesized video, the clone video and the subtitle text may be synthesized into a synthesized video in S311.

Furthermore, in the embodiment described above, as shown in FIGS. 5 to 7, although an example has been described in which the display images 41-1 to 41-$n$ such as the slides are two-dimensionally displayed, the present invention is not limited to such an example.

Figure 13:
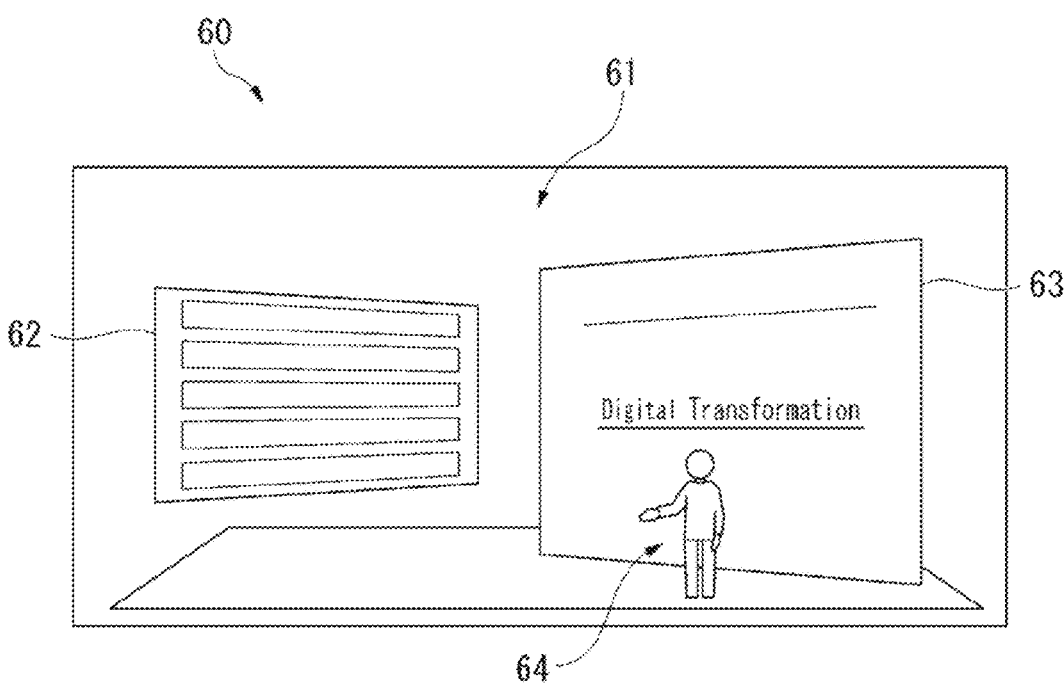
FIG. 13 is a diagram showing an example of a synthesized video according to a modification of an embodiment of the present invention.

For example, as shown in FIG. 13, the content generation device 20 may generate 3D content in which the display image such as the slides and the digital clone (3D avatar) are arranged in a 3D space that is displayed in 3D. As shown in FIG. 13, in the synthesized video 60 generated by the content generation device 20 in the present modification, two display images 62 and 63 displayed in 3D, and a 3D avatar 64 are arranged in a 3D space 61. Each of the two display images 62 and 63 are diagonally expressed such that one end portion in the left-right direction of the synthesized video 60 (the end portion nearer the peripheral edge portion of the synthesized video 60) is positioned closer to the viewer side of the synthesized video 60 than the other end portion. However, the display of the 3D space is not limited to the example shown in FIG. 13, and the number, size, arrangement position, and direction of the incline and the like of the display images may be appropriately changed. The two display images 62 and 63 display the slides, still images, videos, subtitle text, and the like. A configuration is also possible in which comments and the like that have been uploaded by the viewers of the synthesized video 60 to a social networking service (SNS) are displayed in real-time in the two display images 62 and 63. In FIG. 13, although the 3D avatar 64 is expressed so as to be positioned further toward the viewer side than the two display images 62 and 63, the present invention is not limited to this, and the 3D avatar 64 may be made to move around in the 3D space 61 according to the explanation using the display image, the synthesized voice, and the like, and the 3D avatar 64 may also change the facial expressions, or move body parts such as the mouth, head, hands, feet, and torso. In addition, in the embodiment described above, although the clone video is firstly created from the synthesized voice and the user's personal image, and the synthesized video is then created using the clone video, in the case of 3D content using a 3D space, the synthesized video may be produced by creating a 3D avatar corresponding to the user by using the personal image, and then extracting a status such as the 3D avatar moving the mouth according to the synthesized voice in the 3D space. That is, the generation of the clone video and the generation of the synthesized video may be performed at the same time, and this is the same in the embodiment described above.

Furthermore, in the embodiment above, as shown in FIGS. 5 to 7, although an example has been described in which each of the synthesized videos 40-1 to 40-$n$ display the display images 41-1 to 41-$n$, such as slides, still images, and videos, the clone videos 42-1 to 42-$n$, and the subtitle text 43-1 and 43-$n$ at the same time, the present invention is not limited such an example.

For example, the synthesized video of the present modification may be a video in which the display image, such as slides, still images, and videos, the clone video, the subtitle text, and the like are consecutively combined, such that the display form changes with time. In other words, the synthesized video may be one in which at least one of the slides, still images, videos, clone videos, subtitle text, and the like, are displayed at a certain point in time of the synthesized video being played back.

Moreover, in the embodiment above, although an example has been described in which the image generation unit 247 generates a personal image for synthesis (personal image) in which the user's motions change according to the synthesized voice, and the synthesis unit 248 generates a synthesized video using the synthesized voice and the generated personal image for synthesis, the present invention is not limited to such an example.

For example, the synthesis unit 248 may generate the synthesized video using a personal image of a user that is independent of the synthesized voice (hereinafter, sometimes referred to as independent personal image). The independent personal image is a personal image in which the user's motions do not change according to the synthesized voice, and examples include a user's still image, and a video in which the mouth of the user's image (digital clone) is moving irrespective of the synthesized voice. The independent personal image may be an image acquired from the user terminal 10 via the communication unit 210 and may also be an image generated by the image generation unit 247 from the personal image for learning. When the independent personal image is acquired from the user terminal 10 via the communication unit 210, the image generation unit 247 of the content generation device 20 may be omitted.

The modifications of an embodiment of the present invention have been described above.

Note that all or part of the content generation device 20 in the embodiment described above may be implemented by a computer. The computer may include at least one processor and one memory. In this case, a program that achieves the functions may be recorded on a computer-readable recording medium, such that a computer system can read and execute the program recorded on the recording medium.

Note that the "computer system" referred to here includes an operating system (OS) and hardware such as peripheral devices.

Furthermore, the "computer-readable recording medium" refers to a portable medium such as a flexible disk, a magnetooptical disk, a ROM, or a CD-ROM, or a storage device such as a hard disk built into the computer system. In addition, the "computer-readable recording medium" may include a medium that dynamically retains a program for a short period of time, such as a communication line that transmits a program through a network such as the Internet or a telecommunication line such as a telephone line, or a medium that retains the program for a given period of time in that case, such as a volatile memory of a computer system that serves as a server or a client.

Also, the program mentioned above may be a program for implementing some of the functions described above or may be a program that implements the functions described above in combination with a program recorded in advance in a computer system or may be a program that implements the functions using a programmable logic device such as a field programmable gate array (FPGA).

One aspect of the present invention is a recording medium that non-temporarily stores a program, wherein the program causes a computer to function as: an acquisition unit that acquires text data representing a first text, being a reading target; a voice generation unit that, using a voice generation model that based on a voice in which a user has read out a second text, being a learning target, has learned a way of reading out the second text in the voice of the user, generates a synthesized voice in which the first text represented by the acquired text data is read out in the voice of the user; and a synthesis unit that generates synthesized content by synthesizing a generated synthesized voice and a personal image of the user.

An embodiment of the present invention has been described above with reference to the drawings. However, specific configurations are not limited to those described above, and may include various design changes and the like within a scope not departing from the spirit of the present invention.

Various techniques have been proposed for communicating between users by using characters and the like that represent the users as avatars.

For example, in JP H11-312160 A below, a technique is described that uses an independent and moving character as an avatar to promote communication relating to a document between users. In this technique, voice data is prepared in advance by recording a user's voice, and by defining a facial expression of the avatar to change when the voice data is played back, the avatar can be made to appear as though it is reading out the text corresponding to the voice data. As a result, for example, it is possible to have the avatar give a presentation on behalf of the user, who is the speaker.

However, simply using a speaker's avatar and a speaker's voice data in the manner of the technique of JP H11-312160 A above does not sufficiently reproduce the speaker's likeness and can cause the listeners of the presentation to feel a sense of awkwardness. This sense of awkwardness hinders the concentration of the listeners on the presentation.

A content generation device, a content generation method, and a program according to embodiments of the present invention can reduce the sense of awkwardness felt by listeners when text is read out and can more fully express the speaker's likeness.

A content generation device according to an aspect of the present invention includes: an acquisition unit that acquires text data representing a first text, being a reading target; a voice generation unit that, using a voice generation model that based on a voice in which a user has read out a second text, being a learning target, has learned a way of reading out the second text in a voice of the user, generates a synthesized voice in which the first text represented by the acquired text data is read out in the voice of the user; and a synthesis unit that generates synthesized content by synthesizing a generated synthesized voice and a personal image of the user.

A content generation method according to another aspect of the present invention includes: an acquisition process for causing an acquisition unit to acquire text data representing a first text, being a reading target; a voice generation process for causing a voice generation unit to generate, using a voice generation model that based on a voice in which a user has read out a second text, being a learning target, has learned a way of reading out the second text in a voice of the user, a synthesized voice in which the first text represented by the acquired text data is read out in the voice of the user; and a synthesis process for causing a synthesis unit to generate synthesized content by synthesizing a generated synthesized voice and a personal image of the user.

A program according to yet another aspect of the present invention causes a computer to function as: an acquisition unit that acquires text data representing a first text, being a reading target; a voice generation unit that, using a voice generation model that based on a voice in which a user has read out a second text, being a learning target, has learned a way of reading out the second text in a voice of the user, generates a synthesized voice in which the first text represented by the acquired text data is read out in the voice of the user; and a synthesis unit that generates synthesized content by synthesizing a generated synthesized voice and a personal image of the user.

According to an embodiment of the present invention, it is possible to reduce the sense of awkwardness felt by listeners when text is read out, and to more fully express the likeness of a speaker.

Obviously, numerous modifications and variations of the present invention are possible in light of the above teachings. It is therefore to be understood that within the scope of the appended claims, the invention may be practiced otherwise than as specifically described herein.

The invention claimed is:

1. A content generation device, comprising:
a control unit comprising circuitry configured to acquire text data representing a first text, generate, using a voice generation model, a synthesized voice in which the first text is read out in a voice of the user, and generate synthesized content by synthesizing the synthesized voice and a personal image of the user,
wherein the circuitry of the control unit is configured to learn a way of reading out a second text in the voice of a user based on the reading out of the second text by the user and generate the voice generation model based on the way of reading out the second text in the voice of the user.

2. The content generation device according to claim 1, wherein the circuitry of the control unit is configured to acquire display data that is displayed so as to correspond to a content of the text data, generate, based on the display data, a display image that is displayed so as to correspond to the synthesized voice, and generate synthesized content by synthesizing the synthesized voice and the display image that have been generated, and the personal image of the user.

3. The content generation device according to claim 2, wherein the circuitry of the control unit is configured to generate clone data representing a digital clone of the user by synthesizing the synthesized voice and the personal image and generate the synthesized content by synthesizing the display image and the generated clone data.

4. The content generation device according to claim 3, wherein the circuitry of the control unit is configured to learn a motion of the user based on the personal image for learning, generate an image generation model based on the personal image for learning, generate the personal image, in which a motion of the user changes according to the synthesized voice, using the image generation model, and generate the synthesized content using the personal image.

5. The content generation device according to claim 4, wherein the circuitry of the control unit is configured to generate the personal image such that a movement of a face of the user changes according to a reading by the synthesized voice.

6. The content generation device according to claim 2, wherein the circuitry of the control unit is configured to learn a motion of the user based on the personal image for learning, generate an image generation model based on the personal image for learning, generate the personal image, in which a motion of the user changes according to the synthesized voice, using the image generation model, and generate the synthesized content using the personal image.

7. The content generation device according to claim 6, wherein the circuitry of the control unit is configured to generate the personal image such that a movement of a face of the user changes according to a reading by the synthesized voice.

8. The content generation device according to claim 6, wherein the circuitry of the control unit is configured to generate the personal image that changes a gesture of the user according to a reading by the synthesized voice.

9. The content generation device according to claim 1, wherein the circuitry of the control unit is configured to divide the first text into a plurality of pieces based on an input indicating a dividing location of the first text and generate the synthesized voice for each piece of the divided first text.

10. The content generation device according to claim 1, wherein the circuitry of the control unit is configured to determine a playback time of the synthesized content based on a number of characters in the first text.

11. The content generation device according to claim 10, wherein the circuitry of the control unit is configured to determine a playback time of the synthesized content based on a reading speed of the synthesized voice.

12. The content generation device according to claim 11, wherein the circuitry of the control unit is configured to add a time required to express a pause in reading the first text to the playback time calculated based on at least one of the number of characters in the first text and a reading speed of the synthesized voice.

13. The content generation device according to claim 1, wherein the circuitry of the control unit is configured to use the voice generation model corresponding to a second language, which is different from a first language, that has been obtained by transfer learning based on a voice in a first language used in learning by the voice generation model, which corresponds to the first language, and generate the synthesized voice in which the first text in the first language is read out in a voice of the user using the second language.

14. The content generation device according to claim 1, wherein the circuitry of the control unit is configured to generate subtitle text based on the first text represented by the acquired text data and generate the synthesized content by synthesizing the generated subtitle text.

15. The content generation device according to claim 14, wherein the circuitry of the control unit is configured to generate the subtitle text for each piece of a divided first text.

16. The content generation device according to claim 14, wherein the circuitry of the control unit is configured to generate the subtitle text in which the text data has been translated according to a language corresponding to the voice generation model.

17. A content generation method, comprising:

acquiring text data representing a first text;

generating, using a voice generation model generated based on a voice in which a user has read out a second text by learning a way of reading out the second text in a voice of the user, a synthesized voice in which the first text represented by the text data is read out in the voice of the user; and generating synthesized content by synthesizing the generated synthesized voice and a personal image of the user.

18. The content generation method according to claim 17, further comprising:

acquiring display data that is displayed to correspond to a content of the text data;

generating, based on the acquired display data, a display image that is displayed to correspond to the synthesized voice; and generating synthesized content by synthesizing the synthesized voice and the display image that have been generated, and the personal image.

19. A non-transitory computer-readable medium stored therein a program that when executed by a computer, a content generation device executes a content generation method, comprising:

acquiring text data representing a first text;

generating, using a voice generation model generated based on a voice in which a user has read out a second text by learning a way of reading out the second text in a voice of the user, a synthesized voice in which the first text represented by the text data is read out in the voice of the user; and generating synthesized content by synthesizing the generated synthesized voice and a personal image of the user.

20. The non-transitory computer-readable medium according to claim 19, wherein the content generation method further includes acquiring display data that is displayed to correspond to a content of the text data, generating, based on the acquired display data, a display image that is displayed to correspond to the synthesized voice, and generating synthesized content by synthesizing the synthesized voice and the display image that have been generated, and the personal image.

* * * * *